(12) United States Patent
Takata et al.

(10) Patent No.: US 9,176,619 B2
(45) Date of Patent: Nov. 3, 2015

(54) INPUT DEVICE

(71) Applicant: ALPS ELECTRIC CO., LTD., Tokyo (JP)

(72) Inventors: Masahiro Takata, Miyagi-ken (JP); Takahiro Murakami, Miyagi-ken (JP); Yoshibumi Abe, Miyagi-ken (JP); Yu Watanabe, Miyagi-ken (JP); Hideto Matsufusa, Tokyo (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 285 days.

(21) Appl. No.: 13/752,224

(22) Filed: Jan. 28, 2013

(65) Prior Publication Data
US 2013/0207928 A1     Aug. 15, 2013

(30) Foreign Application Priority Data

Feb. 10, 2012  (JP) ................. 2012-026907

(51) Int. Cl.
| | |
|---|---|
| G06F 3/045 | (2006.01) |
| G06F 3/041 | (2006.01) |
| G06F 3/044 | (2006.01) |
| G06F 3/0354 | (2013.01) |

(52) U.S. Cl.
CPC .......... *G06F 3/0414* (2013.01); *G06F 3/03547* (2013.01); *G06F 3/044* (2013.01); *G06F 2203/04105* (2013.01)

(58) Field of Classification Search
CPC ..... G06F 3/0488; G06F 3/0484; G06F 3/016; G06F 3/041; G06F 3/04847; G06F 3/0481; G06F 3/04817; G06F 3/04842; G06F 3/0485; G06F 3/0487; G06F 8/65; G06F 17/211; G06F 17/214; G06F 17/289
USPC .......... 345/173–179; 178/18.01–18.11, 19.01
See application file for complete search history.

(56) References Cited

U.S. PATENT DOCUMENTS

| | | | | |
|---|---|---|---|---|
| 8,009,423 | B2* | 8/2011 | Tatsukami | 361/679.58 |
| 2006/0243638 | A1* | 11/2006 | Sato | 206/736 |
| 2010/0079404 | A1 | 4/2010 | Degner et al. | |
| 2010/0149127 | A1* | 6/2010 | Fisher et al. | 345/174 |
| 2010/0156818 | A1* | 6/2010 | Burrough et al. | 345/173 |
| 2011/0057899 | A1* | 3/2011 | Sleeman et al. | 345/174 |
| 2012/0205165 | A1* | 8/2012 | Strittmatter et al. | 178/18.01 |

FOREIGN PATENT DOCUMENTS

JP     2007-299043     11/2007

* cited by examiner

*Primary Examiner* — Kent Chang
*Assistant Examiner* — Scott Au
(74) *Attorney, Agent, or Firm* — Beyer Law Group LLP

(57) ABSTRACT

A connection portion extends from an operation substrate, and a retaining groove of an elastic body is retained in a retaining hole of the connection portion. When a shaft portion of a retaining member is inserted into a through hole of the elastic body and screwed into an internally-threaded hole of a panel, an upper elastic portion of the elastic body is interposed between the connection portion and a support portion of the panel, and a lower elastic portion of the elastic body is interposed between the connection portion and an facing member. When an operation surface of the operation substrate is pressed, the connection portion rotates in a direction and the upper elastic portion and the lower elastic portion of the elastic body are compressed, whereby an appropriate operation reaction force and an elastic return force can be exerted.

9 Claims, 13 Drawing Sheets

INPUT DEVICE

CLAIM OF PRIORITY

This application claims benefit of Japanese Patent Application No. 2012-026907 filed on Feb. 10, 2012, which is hereby incorporated by reference.

BACKGROUND OF THE INVENTION

1. Field of the Invention

The present invention relates to an input device including an operation substrate on which a proximity sensor detecting a contact position or an access position of an operation body is mounted, and particularly relates to an input device which allows a pressing operation to be performed on an operation substrate to actuate a pressing force sensor.

2. Description of the Related Art

A proximity sensor which detects an operation state by a finger or the like by using change in capacitance or the like is mounted in a personal computer, a portable electronic apparatus, or the like. In addition, recently, there is a pressing force sensor which operates when a pressing operation is performed on an operation portion including the proximity sensor.

In a movable track pad disclosed in U.S. Patent Application Publication No. 2010/0079404, an electrode substrate constituting a proximity sensor is provided on a front surface of a reinforcing plate. An end of the reinforcing plate is connected to a frame via a flexure hinge on an elastic plate. A pressing force sensor such as a tact switch is provided on the lower side of the other end of the reinforcing plate.

When a finger touches the movable track pad, the contact position is detected by the proximity sensor, and when the reinforcing plate is further pressed by the finger, the flexure hinge bends and the pressing force sensor operates.

In a three-dimensional data input device disclosed in Japanese Unexamined Patent Application Publication No. 2007-299043, a rotation axis is set at the center of a touch panel, and contact points are arranged on both sides of the rotation axis, respectively. When a finger touches the touch panel, the position is detected as information on X-Y, and when either of both sides of the rotation axis is further pressed by the finger, the touch panel rotates to come into contact with the contact point, whereby Z-axis operation information is obtained.

In the movable track pad disclosed in U.S. Patent Application Publication No. 2010/0079404, although the end of the reinforcing plate and the frame are connected to each other via the plate-shaped flexure hinge, it is necessary to fix the plate-shaped flexure hinge to the frame by means of a screw or the like such that a portion thereof having a predetermined surface area overlaps the frame. Thus, a support region of a wide surface area is required for fixing the flexure hinge to the frame at a sufficient surface area. In addition, it is necessary to screw the reinforcing plate and the flexure hinge to each other at a plurality of locations, and it is also necessary to screw the flexure hinge and the frame to each other at a plurality of locations. Thus, many screwing locations are needed.

Furthermore, a return operation of the reinforcing plate is set by elastic bending of the flexure hinge. Thus, when the reinforcing plate is pressed at a location away from the movable hinge, the repelling force is small and the operation reaction force is felt to be small. Therefore, normally, in addition to the movable hinge, it is necessary to arrange a reinforcing spring between the reinforcing plate and the frame, and thus the number of parts is increased.

In the three-dimensional data input device disclosed in Japanese Unexamined Patent Application Publication No. 2007-299043, springs for returning the touch panel are arranged on both sides of the rotation axis, and thus the number of parts is increased. In addition, unless the elastic forces of the springs arranged on both sides of the rotation axis agree with each other, there is the possibility that a difference occurs between a reaction force when one side of the rotation axis is pressed and a reaction force when the other side of the rotation axis is pressed. Furthermore, an operation surface cannot be kept in a parallel state when no operation force is applied.

SUMMARY OF THE INVENTION

The present invention has been made to solve the above problems and provides an input device which can be made small in size and which allows an appropriate operation reaction force to be obtained when a pressing operation is performed on an operation substrate.

The present invention provides an input device including: an operation substrate on which a proximity sensor is mounted, the proximity sensor detecting that an operation body touches or is close to the proximity sensor; a pressing force sensor detecting a pressing force applied to the operation substrate; a panel supporting the operation substrate; support portions located at least at two locations in the panel; an facing member facing each support portion at an interval; a connection portion located between each support portion and the facing member and extending from the operation substrate; and an elastic body interposed at least either between each support portion and the connection portion or between the facing member and the connection portion. When a pressing force is applied to the operation substrate, the elastic body deforms and the operation substrate moves in a thickness direction thereof to actuate the pressing force sensor.

For example, in the input device according to the present invention, a through hole may be formed in the elastic body, a shaft portion provided in the facing member may be inserted into the through hole and fixed to each support portion, and the elastic body may be compressively deformable toward an axial direction of the shaft portion.

In the input device according to the present invention, when a pressing operation is performed on the operation substrate, a compressive force is mainly applied to the elastic body by the connection portion extending from the operation substrate. Thus, an appropriate operation reaction force can be provided to the operation substrate. It is also unnecessary to provide a reinforcing spring between the support portion and the facing member in addition to the elastic body, and the number of parts can be reduced. In addition, since the elastic body may be a small member interposed between the support portion and the facing member, the support portion of the operation substrate can be reduced in size. In other words, a support structure to support the operation substrate can be made small in size.

According to the present invention, the support portions at the two locations may be located so as to be spaced apart from each other, and the operation substrate may rotate about an imaginary hinge line connecting the support portions at the two locations.

For example, the imaginary hinge line may be located at or near an edge of the operation substrate, and a region of the operation substrate on one side of the imaginary hinge line may be a main pressing operation region. Alternatively, the imaginary hinge line may pass through a middle portion of the operation substrate, and regions of the operation substrate on both sides of the imaginary hinge line may be main pressing operation regions.

In the input device according to the present invention, a return elastic portion is preferably provided in the elastic body so as to extend in a direction perpendicular to the imaginary hinge line.

In the input device, since the return elastic portion is provided in the elastic body, an operation reaction force provided when a pressing operation is performed on the operation substrate can be appropriately set by adjusting the thickness and the length dimension of the return elastic portion.

According to the present invention, the operation substrate may include a metal plate, a sensor substrate provided on a front surface of the metal plate and made from a synthetic resin film, and an insulating cover layer covering the sensor substrate, an electrode layer constituting the proximity sensor may be provided on the sensor substrate, and the metal plate may be set at a ground potential.

In the above configuration, the metal plate can be used as a reinforcing member for the film-like sensor substrate and can be caused to serve as a ground layer located on the lower side of the sensor substrate.

In addition, according to the present invention, preferably, a second metal plate is stacked on and joined to a back surface of the metal plate, and a portion of the second metal plate is bent to form the connection portion.

As described above, since the connection portion is formed in the second metal plate, flatness of the metal plate provided on the lower surface of the sensor substrate can be maintained.

According to the present invention, a portion of the sensor substrate may extend to a back surface of the metal plate, a circuit component may be mounted on the sensor substrate located on a back surface side or on a component-mounting substrate connected to the sensor substrate, and an earth-conduction portion of a circuit-mounting portion may be electrically joined to the metal plate.

Furthermore, according to the present invention, a portion of the sensor substrate may extend to a back surface of the metal plate, and the pressing force sensor may be mounted on the sensor substrate located on a back surface side.

DESCRIPTION OF THE PREFERRED EMBODIMENTS

Figure 1:
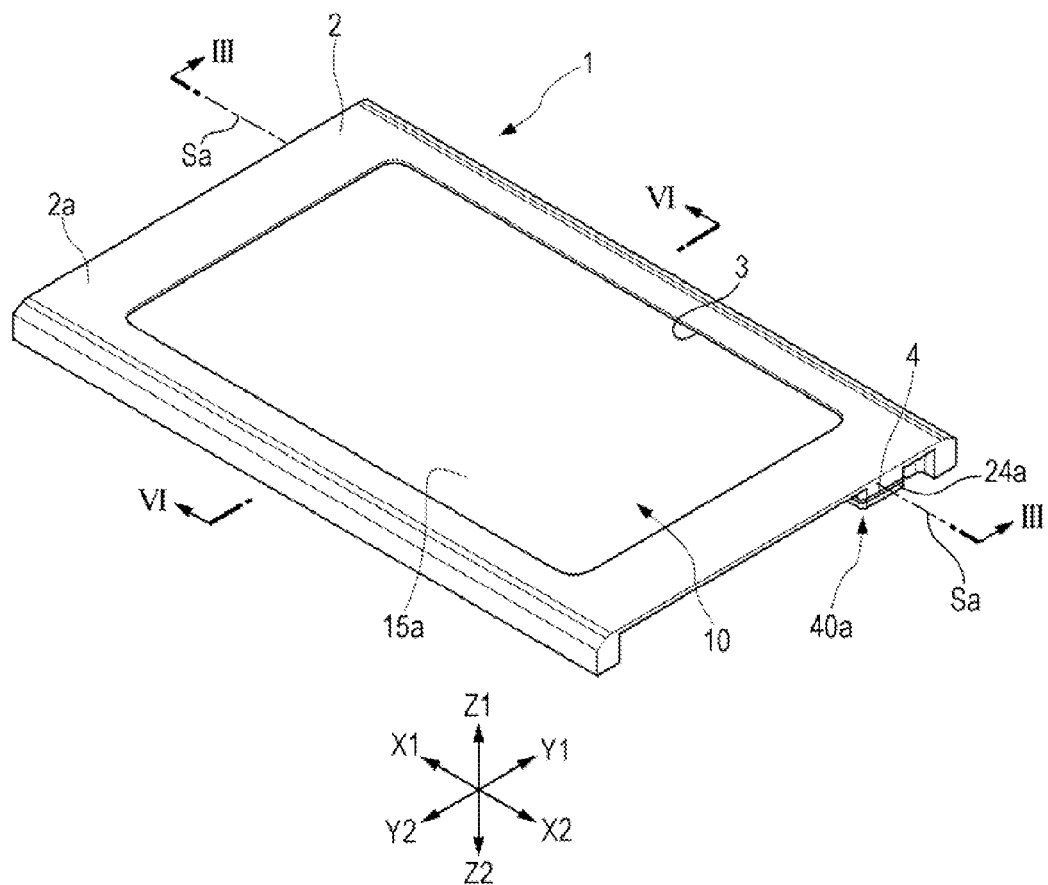
FIG. 1 is a perspective view when an input device according to a first embodiment of the present invention is seen from an operation surface side.
Figure 2:
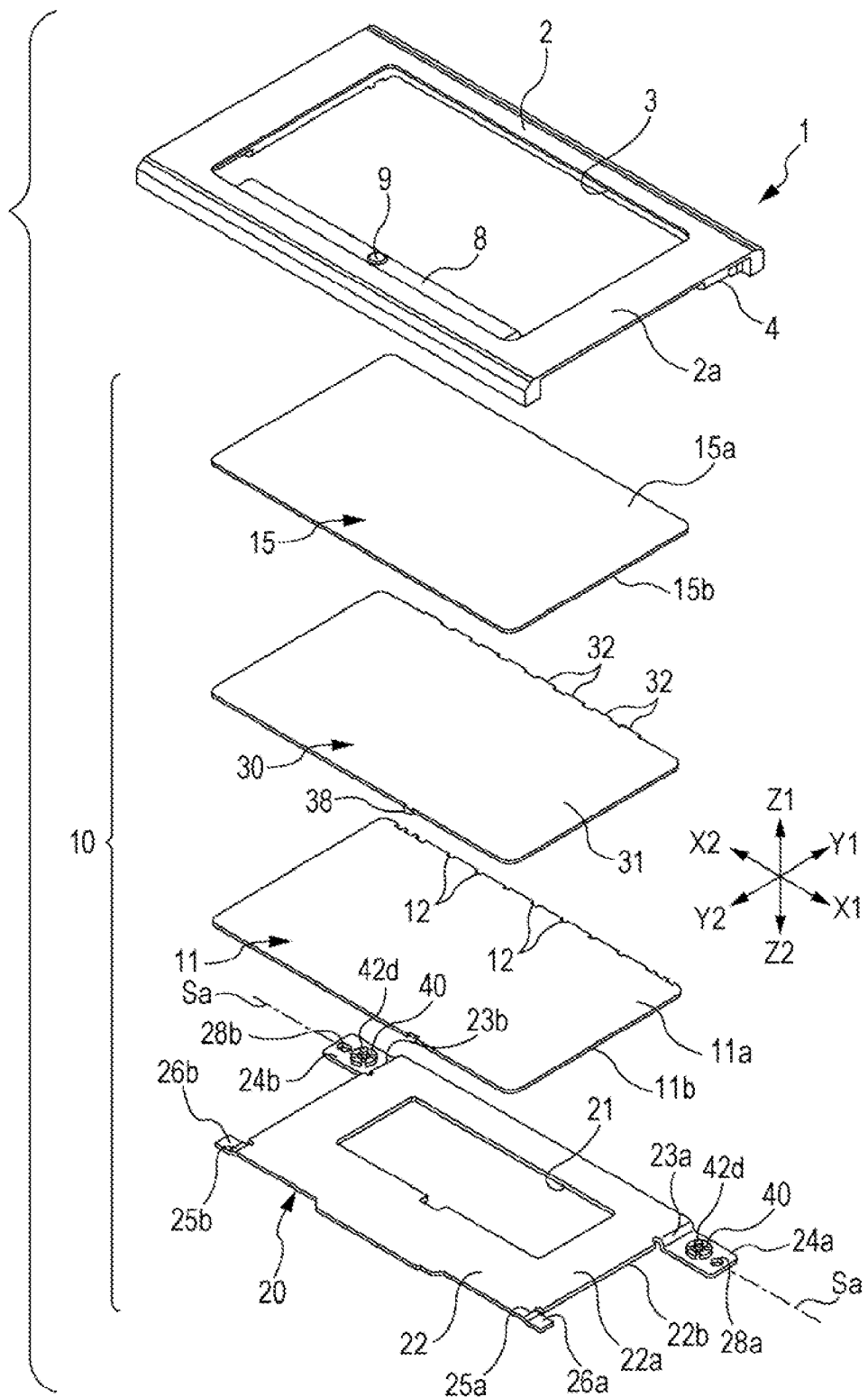
FIG. 2 is an exploded perspective view showing major components of the input device according to the first embodiment.

In an input device 1 according to a first embodiment shown in FIGS. 1 and 2, a square opening 3 is formed in a panel 2. The panel 2 is shown in a small dimension in FIGS. 1 and 2, but the actual panel 2 is a portion of a housing located on a near side of a keyboard device of a personal computer. Or, the panel 2 is a portion of an operation panel of a portable electronic apparatus or an electronic apparatus such as a game apparatus or a remote controller.

An operation substrate 10 is located within the opening 3 of the panel 2. As shown in an exploded perspective view of FIG. 2, the operation substrate 10 includes a first metal plate 11, a second metal plate 20 stacked on a lower side (Z2 side) of the first metal plate 11, a sensor substrate 30 stacked on an upper side (Z1 side) of the first metal plate 11, and a cover sheet (cover layer) 15 stacked further on an upper side (Z1 side) of the sensor substrate 30.

The first metal plate 11 supports the sensor substrate 30, further serves to set a back portion of the sensor substrate 30 at a ground potential, and is formed from a rolled steel plate whose surface is subjected to plating with zinc or the like. There is no bent portion formed in the first metal plate 11, and flatness of a front surface 11a and a back surface 11b of the first metal plate 11 is maintained high.

Figure 4:
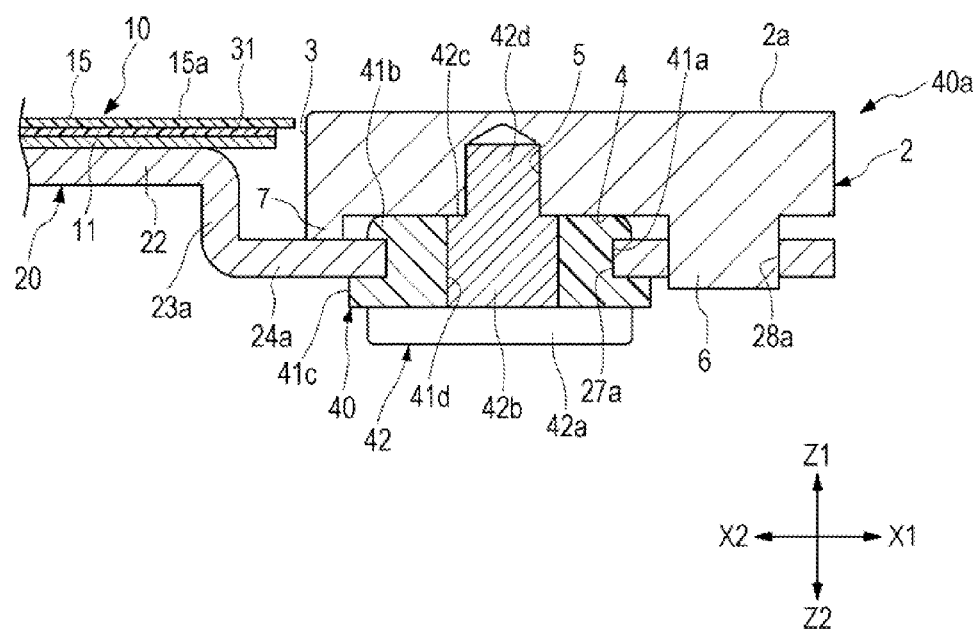
FIG. 4 is a partially-enlarged cross-sectional view of FIG. 3, showing a support structure portion for a connection portion.
Figure 7:
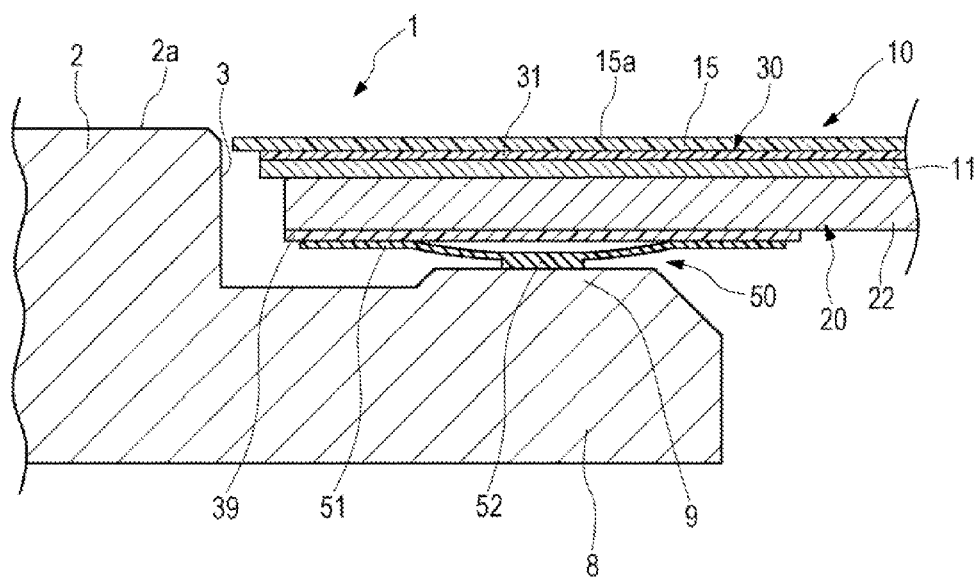
FIG. 7 is a partially-enlarged cross-sectional view of FIG. 6, showing a structure of a pressing force sensor.

The second metal plate 20 serves to connect and support the operation substrate 10 to the panel 2, and is formed from a rolled steel plate whose surface is subjected to plating with zinc or the like. As shown in FIGS. 4 and 7 and the like, the second metal plate 20 is formed from a steel plate having a thickness larger than that of the first metal plate 11. As shown in FIG. 2, the second metal plate 20 has an opening 21 at a center portion thereof. The second metal plate 20 includes a frame portion 22 surrounding the entire periphery of the opening 21 in the four directions, the back surface 11b of the first metal plate 11 is located on a front surface 22a of the frame portion 22, and the first metal plate 11 and the second metal plate 20 are fixed to each other. The fixing means is required to firmly fix the first metal plate 11 to the second metal plate 20 and electrically conduct the first metal plate 11 to the second metal plate 20. In the embodiment, the first metal plate 11 and the frame portion 22 are fixed to each other by means of spot welding.

A step portion 23a is provided at an end of the second metal plate 20 on a front side (Y1 side) so as to extend in a right direction (X1 direction) and be bent in a downward direction (Z2 direction), and a right-side connection portion 24a is formed so as to extend from the step portion 23a in the right direction in a planar manner. In addition, a step portion 23b is provided so as to extend in a left direction (X2 direction) and be bent in the downward direction, and a left-side connection portion 24b is formed so as to extend from the step portion 23b in the left direction in a planar manner.

A step portion 25a is provided at an end of the second metal plate 20 on a back side (Y2 side) so as to extend in the right direction and be lowered slightly in the downward direction, and a right-side stopper piece 26a is formed so as to extend from the step portion 25a in the right direction in a planar manner. In addition, a step portion 25b is formed so as to extend in the left direction and be lowered slightly in the downward direction, and a left-side stopper piece 26b is formed so as to extend from the step portion 25b in the left direction in a planar manner.

The right-side connection portion 24a and the left-side connection portion 24b and the right-side stopper piece 26a and the left-side stopper piece 26b are all formed by bending the second metal plate 20. Meanwhile, the step portions, the connection portions 24a and 24b, and the stopper pieces 26a and 26b are not formed in the first metal plate 11 by bending, and the first metal plate 11 is formed with flatness maintained. In addition, the first metal plate 11 is partially joined to the flat frame portion 22 of the second metal plate 20 by means of spot welding at a plurality of locations. Thus, the flatness of the front surface 11a of the first metal plate 11 can be maintained.

Figure 6:
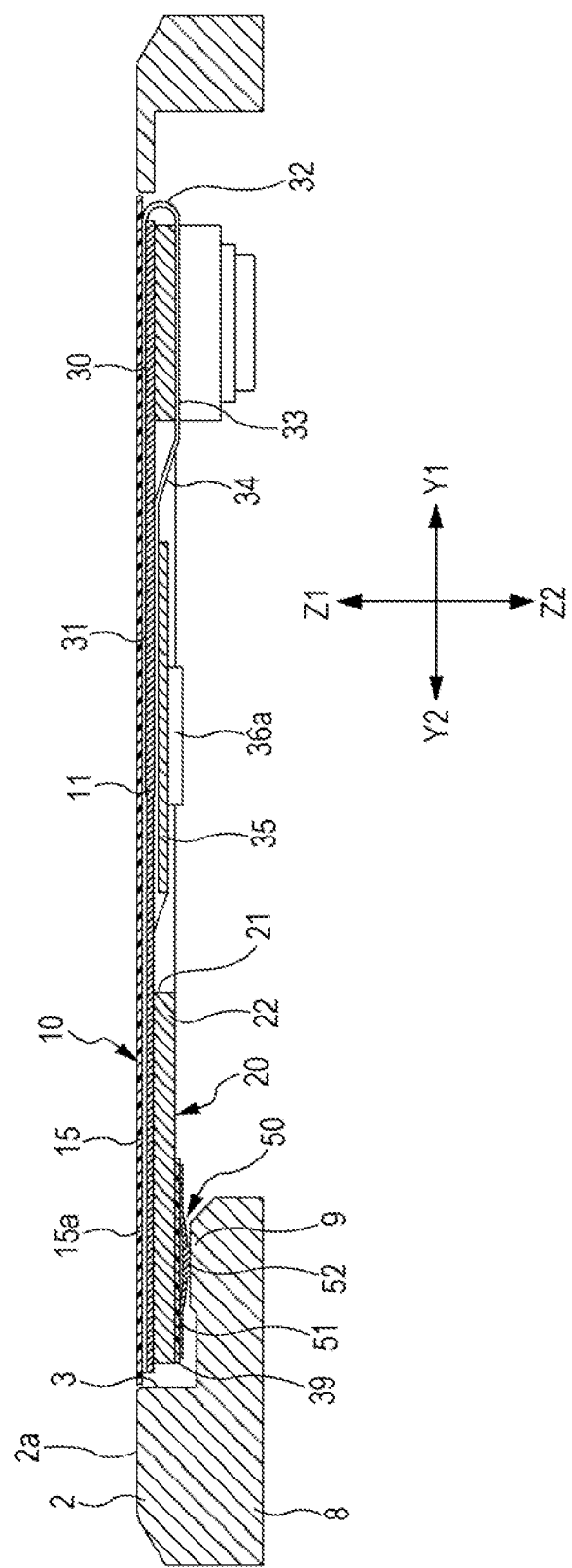
FIG. 6 is a cross-sectional view of the input device shown in FIG. 1, taken along the VI-VI line.
Figure 8:
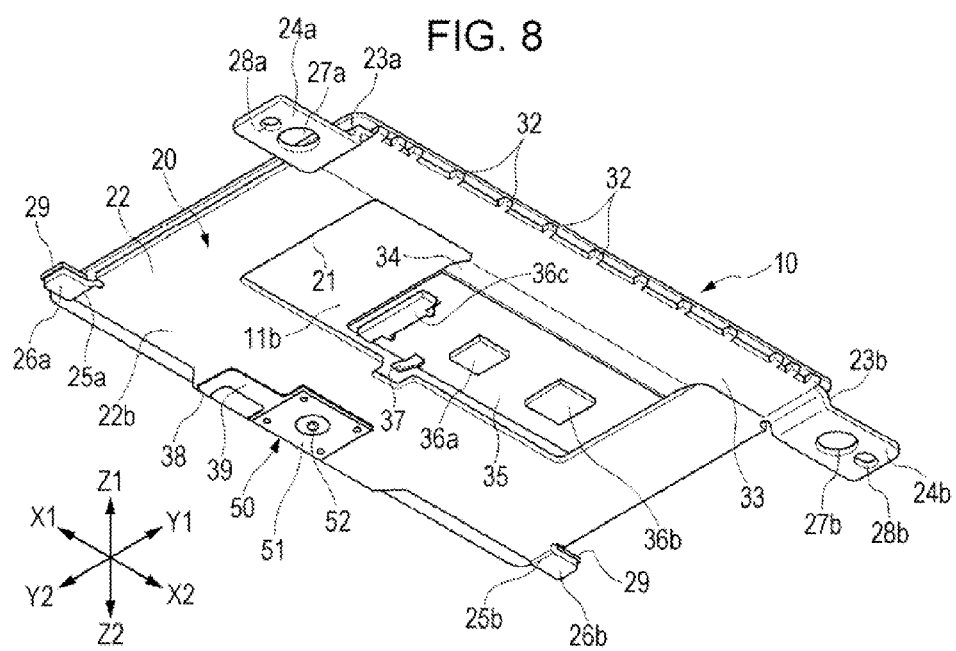
FIG. 8 is a perspective view when a back surface of an operation substrate used in the input device according to the first embodiment is seen from an oblique lower side.

The sensor substrate 30 is formed with a flexible resin film, such as polyimide, as a base material. As shown in FIGS. 6 and 8, the sensor substrate 30 is located on the front surface 11a of the first metal plate 11, and is partially bent to extend to a back surface 22b of the frame portion 22 of the second metal plate 20 and the back surface 11b of the first metal plate 11.

A portion of the sensor substrate 30 which is stacked on the upper side of the first metal plate 11 is a detection portion 31. The detection portion 31 is a proximity sensor which detects that a finger which is an operation body is close to the sensor, on the basis of change in capacitance. The detection portion 31 is formed by insulating a plurality of X electrode layers extending in an X direction and a plurality of Y electrode layers extending in a Y direction, from each other. In addition, an insulating layer is formed so as to cover the X electrode layers and the Y electrode layers.

The detection portion 31 has substantially the same surface area as that of the front surface 11a of the first metal plate 11, and the X electrode layers and the Y electrode layers are provided over the substantially entire region of the detection portion 31 of this surface area. The detection portion 31 is adhered and fixed at the entire back surface thereof to the front surface 11a of the first metal plate 11 via a pressure sensitive adhesive layer. Since the detection portion 31 constituting the proximity sensor is adhered to the front surface 11a of the first metal plate 11 whose flatness is maintained, the entire surface of the back portion of the detection portion 31 can be uniformly attached to the front surface 11a.

It is noted that in the present invention, instead of the capacitive proximity sensor, a contact sensor in which electrodes or resistors come into contact with each other by contact of an operation body can also be used as the detection portion 31.

As shown in FIGS. 2 and 8, the sensor substrate 30 has a plurality of bent portions 32 extending from an edge of the detection portion 31 on the Y1 side, and a back surface installation portion 33 extends from ends of the bent portions 32. A plurality of recesses 12 are formed in an edge of the first metal plate 11 facing the Y1 side. The bent portions 32 of the sensor substrate 30 are bent at the recesses 12, respectively, and the back surface installation portion 33 is adhered and fixed to the back surface 22b of the frame portion 22 of the second metal plate 20 via a pressure sensitive adhesive layer as shown in FIG. 8.

As shown in FIG. 8, a connection portion 34 is integrally formed in the sensor substrate 30 so as to extend from the back surface installation portion 33. A portion of the back surface 11b of the first metal plate 11 is exposed within the opening 21 formed in the second metal plate 20, and a hard component-mounting substrate 35 is adhered and fixed to the portion of the back surface 11b via a pressure sensitive adhesive layer.

Lead patterns are formed on a front surface of the sensor substrate 30 so as to extend from a plurality of the X electrode layers and a plurality of the Y electrode layers, respectively, formed in the detection portion 31. The lead patterns pass through a plurality of the bent portions 32 and extend from the back surface installation portion 33 to the connection portion 34. The lead patterns are connected to a plurality of land portions, respectively, of the component-mounting substrate 35.

As shown in FIG. 8, a plurality of circuit components 36a, 36b, and 36c are mounted on the component-mounting substrate 35. On the component-mounting substrate 35, conductive patterns are formed so as to be conducted to terminal portions of the circuit components 36a, 36b, and 36c, respectively. The conductive patterns are connected to the lead patterns extending to the connection portion 34 of the sensor substrate 30.

A drive circuit for applying a driving voltage for detection to the X electrode layers and the Y electrode layers formed in the detection portion 31 is mounted in each of the circuit components 36a and 36b, and in addition, a detection circuit which detects to which position in the detection portion 31 a finger, which is an operation body, is close is mounted in each of the circuit components 36a and 36b. Furthermore, the circuit component 36c is a connector for connecting to an external circuit.

As shown in FIG. 8, a connection portion 37 is soldered to an earth-conduction portion formed in the component-mounting substrate 35 and is soldered to the back surface 11b of the first metal plate 11. Or, the connection portion 37 is fixed thereto by means of another conductive joining means such as a conductive adhesive. Thus, the first metal plate 11 and the second metal plate 20 are set at a ground potential.

Since the first metal plate 11 adhered to the entire back surface of the detection portion 31 of the sensor substrate 30 is set at a ground potential, a detection operation by the detection portion 31 can be stabilized.

It is noted that the component-mounting substrate 35 may not be provided, the connection portion 34 of the sensor substrate 30 may be adhered within the opening 21 of the second metal plate 20, the circuit components 36a, 36b, and 36c may be mounted on the connection portion 34, and an earth-conduction portion formed in the connection portion 34 and the back surface 11b of the first metal plate 11 may be conducted to each other via the connection portion 37.

Furthermore, in the present invention, the first metal plate 11 may not be used, the sensor substrate 30 may be composed of a thick substrate having high rigidity such as a glass epoxy substrate, and the second metal plate 20 may be fixed to a back surface of the rigid substrate.

As shown in FIG. 8, the component-mounting substrate 35 and the circuit components 36a, 36b, and 36c are located within the opening 21 of the second metal plate 20, and thus the operation substrate 10 can be formed with high rigidity and further so as to be thin.

The cover sheet 15 shown in FIG. 2 has electric insulation properties and is formed from a synthetic resin sheet. In the embodiment, the cover sheet 15 is formed from polyethylene terephthalate (PET). The cover sheet 15 is adhered and fixed at an entire back surface 15b thereof to a front surface of the detection portion 31 of the sensor substrate 30 via a pressure sensitive adhesive layer. A front surface of the cover sheet 15 is an operation surface 15a. An ultraviolet curable resin is applied to the operation surface 15a and small recesses and projections are formed on the surface thereof such that a finger which is an operation body is easily slid on the operation surface 15a.

As shown in FIG. 8, a retaining hole 27a and a positioning hole 28a are formed in the right-side connection portion 24a of the second metal plate 20, and a retaining hole 27b and a positioning hole 28b are formed in the left-side connection portion 24b. The positioning hole 28a on the right side (X1 side) has a perfect circle shape, and the positioning hole 28b on the left side (X2 side) is an elongate hole whose long axis extends in an X1-X2 direction.

As shown in FIG. 8, a cushion sheet 29 is fixed to each of surfaces of the right-side stopper piece 26a and the left-side stopper piece 26b which face in an upward direction (Z1 direction). Each cushion sheet 29 is formed from an elastic body such as thin synthetic rubber or expanded resin.

Figure 5:
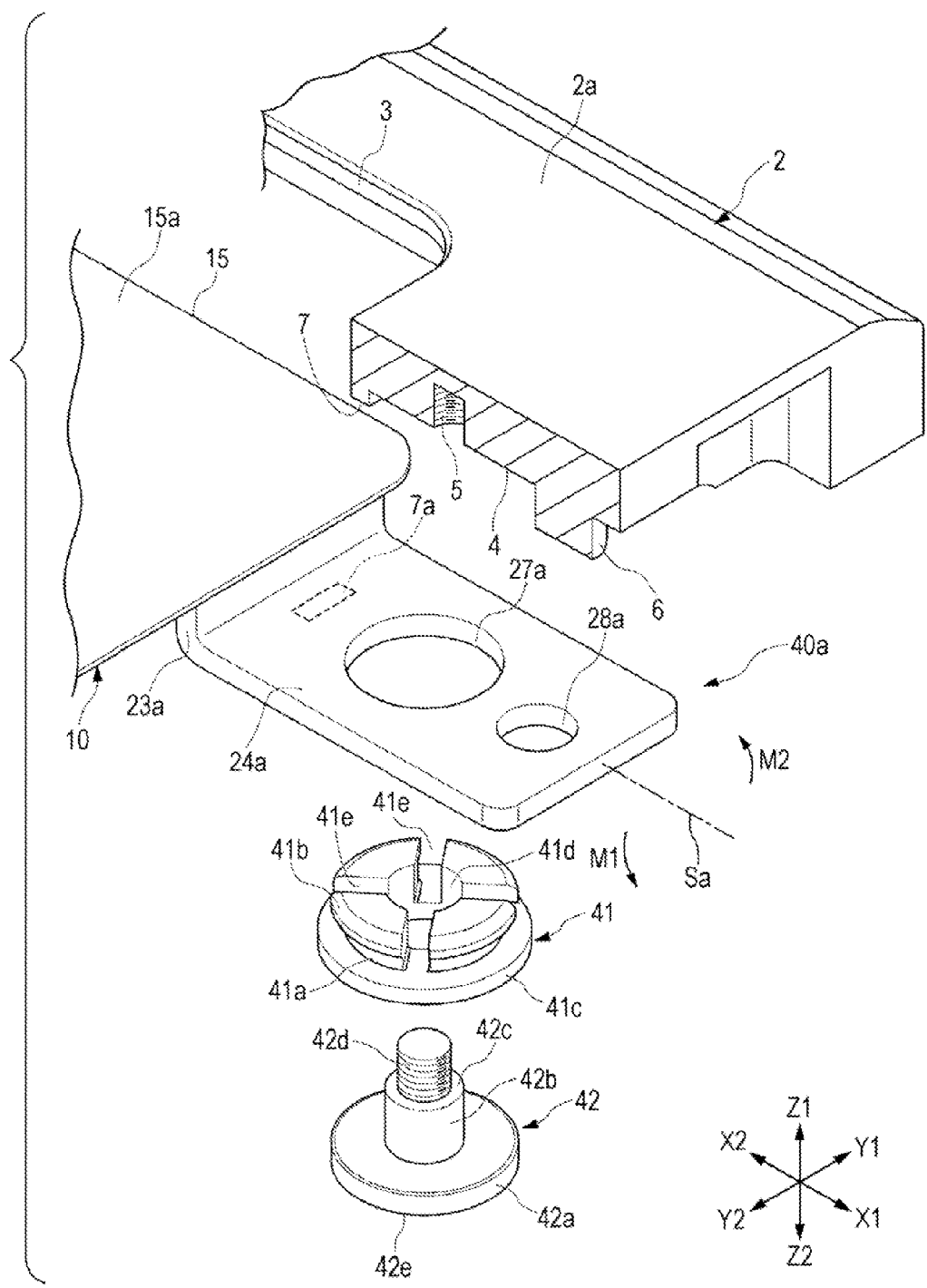
FIG. 5 is an exploded perspective view including a partial cross section showing the support structure portion for the connection portion.

FIGS. 4 and 5 show a right-side support structure portion 40a which supports the right-side connection portion 24a of the second metal plate 20 by a lower surface of the panel 2.

In the right-side support structure portion 40a, a support portion 4 is provided in the lower surface of the panel 2. The support portion 4 is a flat surface parallel to a front surface 2a of the panel 2. An internally-threaded hole 5 is formed in the support portion 4 so as to extend in the upward direction (Z1 direction). A positioning projection 6 whose cross section has a perfect circle shape is integrally provided on the right side (X1 side) of the internally-threaded hole 5 so as to extend in the downward direction. A stopper projection 7 is provided on the left side (X2 side) of the internally-threaded hole 5 so as to extend from the support portion 4 in the downward direction. The stopper projection 7 faces an opposing region 7a of a small surface area in an upper surface of the right-side connection portion 24a extending from the operation substrate 10.

An elastic body 41 is provided in the right-side support structure portion 40a. The elastic body 41 can be compressively deformed in an elastic manner, and is formed from an elastomer material such as synthetic rubber or expanded resin. The elastic body 41 has a retaining groove 41a formed in a middle portion in the up-down direction so as to extend along the entire periphery thereof. An upper elastic portion 41b having a disc shape is formed on the upper side of the retaining groove 41a, and a lower elastic portion 41c having a disc shape is integrally formed on the lower side of the retaining groove 41a. A through hole 41d is formed in the center of the elastic body 41 so as to extend therethrough in the up-down direction. In addition, a cross-shaped groove 41e is formed in the upper elastic portion 41b in order that the upper elastic portion 41b is easily bent toward the through hole 41d.

A retaining member 42 is provided in the right-side support structure portion 40a. The retaining member 42 includes an facing member 42a. The facing member 42a has a disc shape and has a fitting groove which is formed in a front surface 42e thereof and to which a driver is to be fitted such that the facing member 42a can serve as a screw head. A columnar shaft portion 42b extends from the center portion of the facing member 42a in the upward direction (Z1 direction), and an externally-threaded portion 42d is formed at an upper portion of the shaft portion 42b via a step portion 42c. The pitch circle diameter of the externally-threaded portion 42d is smaller than the diameter of the shaft portion 42b.

Figure 3:
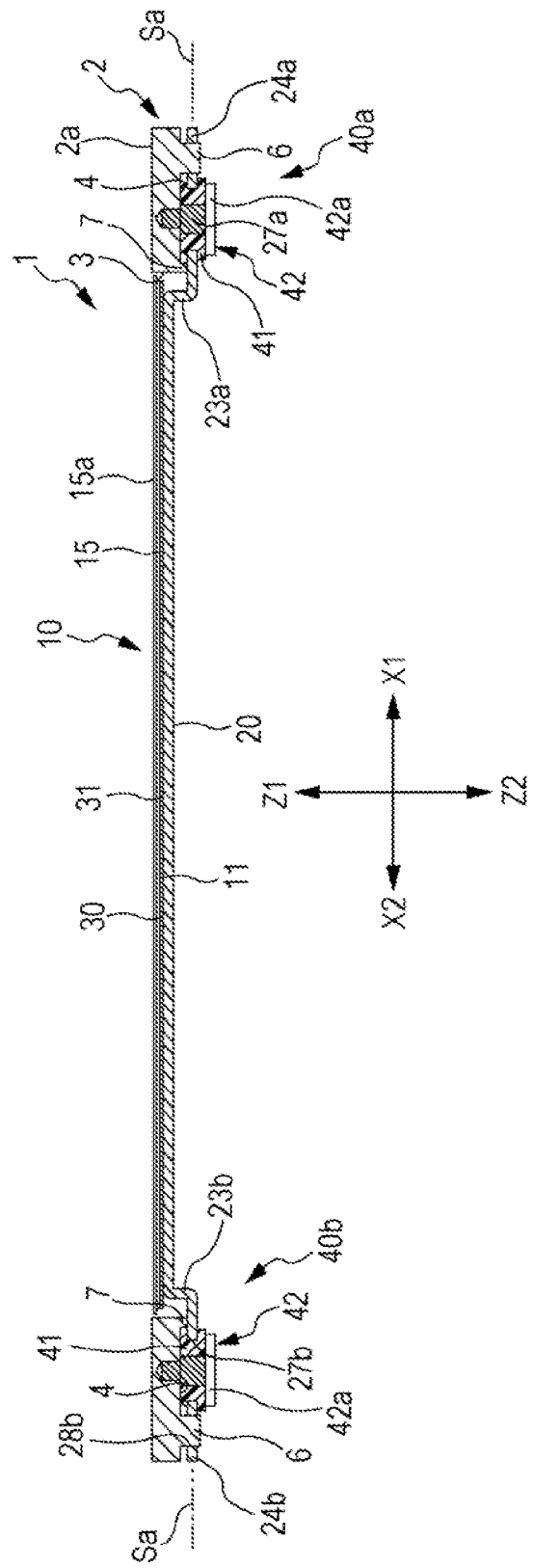
FIG. 3 is a cross-sectional view of the input device shown in FIG. 1, taken along the III-III line.

As shown in FIGS. 2 to 4, in the right-side support structure portion 40a, the elastic body 41 is retained in the retaining hole 27a of the right-side connection portion 24a. The upper elastic portion 41b is contracted in the central direction, and the elastic body 41 is upwardly inserted into the retaining hole 27a from the lower side. As a result, the retaining groove 41a of the elastic body 41 is retained in the retaining hole 27a, the upper elastic portion 41b is located on the upper side of the right-side connection portion 24a, and the lower elastic portion 41c is located on the lower side of the left-side connection portion 24b.

Furthermore, the shaft portion 42b of the retaining member 42 is inserted into the through hole 41d of the elastic body 41 from below, the externally-threaded portion 42d is screwed into the internally-threaded hole 5 of the panel 2, and the retaining member 42 is fastened in a state where the step portion 42c is abutted against the support portion 4. As a result, as shown in FIGS. 3 and 4, the facing member 42a faces the support portion 4 in the up-down direction, and the elastic body 41 is located therebetween. The thickness dimension of the elastic body 41 in the up-down direction is set so as to be larger than the interval at which the support portion 4 and the facing member 42a faces each other in the up-down direction, and the elastic body 41 is interposed between the support portion 4 and the facing member 42a in a state of being slightly compressed in the up-down direction.

As shown in FIGS. 3 and 4, the positioning projection 6 extending from the support portion 4 in the downward direction is inserted into the positioning hole 28a of the right-side connection portion 24a through a slight gap, and the right-side connection portion 24a is positioned with respect to the panel 2 in the X direction and the Y direction. In addition, the stopper projection 7 extending from the support portion 4 in the downward direction faces the opposing region 7a of the right-side connection portion 24a, and the right-side connection portion 24a is restrained from excessively rising in the upward direction (Z1 direction).

As shown in FIGS. 3 and 4, in the right-side support structure portion 40a, the upper elastic portion 41b of the elastic body 41 is interposed between the right-side connection portion 24a and the support portion 4, and the lower elastic portion 41c of the elastic body 41 is interposed between the right-side connection portion 24a and the facing member 42a.

In the right-side support structure portion 40a, since the through hole 41d of the elastic body 41 is inserted onto the shaft portion 42b of the retaining member 42, the installed position of the elastic body 41 can be determined with high accuracy. In addition, since the right-side connection portion 24a is supported by the panel 2 via the single elastic body 41, an error in the installed position of the right-side connection portion 24a is unlikely to occur. Furthermore, it is also possible to control an operation reaction force or a restoring force by changing the compressed state of the elastic body 41 by the fastening force of the retaining member 42.

FIG. 3 shows a left-side support structure portion 40b which supports the left-side connection portion 24b of the second metal plate 20 by the lower surface of the panel 2.

The support structure of the left-side support structure portion 40b for the left-side connection portion 24b is substantially the same as that of the right-side support structure portion 40a.

In the left-side support structure portion 40b, the elongate-hole-shaped positioning hole 28b of the left-side connection portion 24b is inserted onto the positioning projection 6 extending from the support portion 4 in the downward direction, and the left-side connection portion 24b is positioned in the Y direction. The elastic body 41 is retained in the retaining hole 27b of the left-side connection portion 24b, the shaft portion 42b of the retaining member 42 is inserted into the through hole 41d of the elastic body 41, and the externally-threaded portion 42d is screwed into the internally-threaded hole 5 opened in the support portion 4.

As a result, in the left-side support structure portion 40b as well, the facing member 42a faces the lower side of the support portion 4 of the panel 2, the left-side connection portion 24b is located therebetween, the upper elastic portion 41b of the elastic body 41 is interposed between the left-side connection portion 24b and the support portion 4, and the lower elastic portion 41c of the elastic body 41 is interposed between the left-side connection portion 24b and the facing member 42a.

As shown in FIGS. 2 and 6, on the back side of the opening region of the opening 3 (Y2 side), a supportive portion 8 is integrally formed in the panel 2 at a position below the front surface 2a of the panel 2. On a front surface of the supportive portion 8, a receiving portion 9 is integrally formed at the center portion in the X direction so as to extend in the upward direction.

As shown in FIG. 2, in the sensor substrate 30, a bent portion 38 is provided so as to be bent from an edge of the detection portion 31 on the Y2 side in the downward direction. As shown in FIG. 8, an extension portion 39 extends from the bent portion 38 on the back surface 22b of the frame portion 22 of the second metal plate 20 of the operation substrate 10.

The extension portion 39 and the back surface 22b of the frame portion 22 are adhered to each other via a pressure sensitive adhesive, and a pressing force sensor 50 is mounted on the extension portion 39. As shown in FIG. 7 in an enlarged manner, an insulating retaining tape 51 is provided on a front surface of the extension portion 39. An inversion portion 52 is formed on an upper surface of the retaining tape 51 by attaching a dome-shaped movable contact point formed from a thin metal plate and projecting in the downward direction. The retaining tape 51 is adhered and fixed to the front surface of the extension portion 39 around the inversion portion 52. Two electrode layers are formed on the front surface of the extension portion 39 of the sensor substrate 30. When the inversion portion 52 is pressed upward, the movable contact point is inverted to come into contact with the two electrode layers, and the electrode layers are conducted to each other.

Lead patterns extending from the two electrode layers constituting the pressing force sensor 50 bypass the edge portion of the detection portion 31 of the sensor substrate 30, pass through the front surfaces of the back surface installation portion 33 and the connection portion 34, and are connected to the circuit component 36a or 36b shown in FIG. 8.

It is noted that the pressing force sensor 50 can be composed of a strain sensor or can also be composed of a tact switch.

As shown in FIGS. 6 and 7, in a state where the right-side connection portion 24a and the left-side connection portion 24b of the operation substrate 10 are supported by the right-side support structure portion 40a and the left-side support structure portion 40b of the panel 2, the edge of the operation substrate 10 on the Y2 side is located on the supportive portion 8 formed in the back of the panel 2, and the inversion portion 52 constituting the pressing force sensor 50 faces the receiving portion 9 projecting from the supportive portion 8.

The right-side connection portion 24a and the left-side connection portion 24b are supported on the lower surface side of the panel 2 in the right-side support structure portion 40a and the left-side support structure portion 40b. However, since the right-side connection portion 24a and the left-side connection portion 24b are bent via the step portions 23a and 23b and located below the operation surface 15a which is the front surface of the operation substrate 10, a step between the operation surface 15a located in the opening 3 of the panel 2 and the front surface 2a of the panel 2 is slight, and the operation surface 15a and the front surface 2a of the panel 2 are substantially parallel to each other. In addition, the stopper pieces 26a and 26b projecting on both lateral sides of the operation substrate 10 in the back thereof face the lower surface of the panel 2, and the back portion of the operation surface 15a is restrained from excessively projecting upwardly from the opening 3.

Next, an operation of the input device 1 will be described.

When no pressing force is applied to the operation surface 15a of the operation substrate 10, the right-side connection portion 24a is retained in a horizontal attitude by the elastic body 41 in the right-side support structure portion 40a as shown in FIG. 4, and the left-side connection portion 24b is retained in a horizontal attitude by the elastic body 41 in the left-side support structure portion 40b as well. Thus, the operation surface 15a which is the front surface of the operation substrate 10 is in such an attitude as to be substantially parallel to the front surface 2a of the panel 2.

By the drive circuits provided in the circuit components 36a and 36b shown in FIG. 8, a voltage is applied in order to the X electrode layers provided in the detection portion 31 of the sensor substrate 30, and a voltage is applied in order to the Y electrode layers at timings that do not overlap the timings at which the voltage is applied to the X electrode layers. At rising and falling of the voltage applied to the X electrode layer, a current instantaneously flows in the Y electrode layer facing the X electrode layer via a capacitance and is detected by the detection circuits provided in the circuit components 36a and 36b. When a finger which is an operation body touches the operation surface 15a which is the front surface of the cover sheet 15, a capacitance is formed between the finger which is substantially at a ground potential and the X electrode layer close to the finger. Thus, when a voltage is applied to the X electrode layer close to the finger, a current flowing in the Y electrode layer changes.

The detection circuits can detect at which coordinate position in the Y direction the finger touches or is close to the operation surface 15a, from information about to which X electrode layer a voltage is applied and the values of currents flowing in the Y electrode layers. Similarly, by monitoring currents in the X electrode layers when a voltage is applied in order to the Y electrode layers, the detection circuits can detect at which coordinate position in the X direction the finger touches or is close to the operation surface 15a.

As shown in FIGS. 1 to 4, in the input device 1, an imaginary line connecting the center of the through hole 41d of the elastic body 41 provided in the right-side support structure portion 40a to the center of the through hole 41d of the elastic body 41 provided in the left-side support structure portion 40b is an imaginary hinge line Sa, and the operation substrate 10 can rotate about the imaginary hinge line Sa.

In the input device 1 according to the first embodiment, the imaginary hinge line Sa is located substantially at the edge of the operation substrate 10 on the Y1 side or is located near the edge. Thus, a region of the operation surface 15a on the Y2 side of the imaginary hinge line Sa is a main pressing operation region.

When a certain location in the pressing operation region of the operation surface 15a is pressed in the downward direction which is the Z2 direction, a portion of the right-side connection portion 24a on the Y2 side of the imaginary hinge line Sa rotates in an M1 direction and a portion of the right-side connection portion 24a on the Y1 side of the imaginary hinge line Sa rotates in an M2 direction as shown in FIG. 5. Thus, the lower elastic portion 41c of the elastic body 41 is compressively deformed between the right-side connection portion 24a and the facing member 42a on the Y2 side of the imaginary hinge line Sa, and the upper elastic portion 41b of the elastic body 41 is compressively deformed between the right-side connection portion 24a and the support portion 4 of the panel 2 on the Y1 side of the imaginary hinge line Sa. This is also the same in the left-side support structure portion 40b.

An operation reaction force provided when the operation surface 15a is pressed by a finger is exerted by the resistivity of the compressive deformation of the lower elastic portion 41c and the upper elastic portion 41b. In addition, when the pressing force applied to the operation surface 15a is released, the operation substrate 10 returns to the attitude in which the operation surface 15a is parallel, by the restoring force of the compressive deformation of the lower elastic portion 41c and the upper elastic portion 41b.

Since the elastic bodies 41 are disc-shaped and small in size in the right-side support structure portion 40a and the left-side support structure portion 40b, the support structure portions 40a and 40b can be arranged so as to not greatly protrude to the panel 2 side, and the space for the support structure around the operation substrate 10 can be narrowed. In addition, the support structure portions 40a and 40b can exert great elastic forces even though the elastic bodies 41 are small in size since the operation reaction force and the restoring force are exerted by the compressive deformation of the elastic bodies 41, and thus an operation feeling is favorable. Therefore, in addition to the two elastic bodies 41, it is not necessary to additionally provide an auxiliary spring for supporting the operation substrate 10 from below. However, in the present invention, an auxiliary spring may be provided according to need in addition to the elastic bodies 41.

When the pressing operation region of the operation surface 15a is pressed, the inversion portion 52 of the pressing force sensor 50 shown in FIGS. 6 and 7 is pressed against the receiving portion 9 of the panel 2 and is inverted, the dome-shaped movable contact point comes into contact with the electrode layers on the front surface of the extension portion 39 of the sensor substrate 30, the electrode layers are conducted to each other, and the pressing force sensor 50 is in a state of detecting the pressing force.

Figure 9:
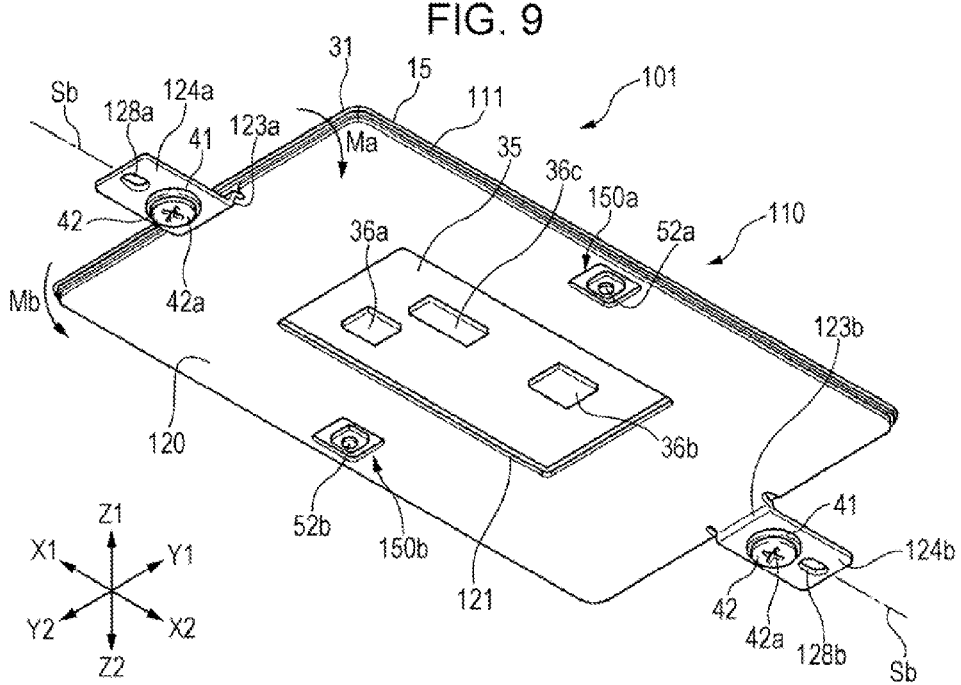
FIG. 9 is a perspective view when a back surface of an operation substrate used in an input device according to a second embodiment of the present invention is seen from an oblique lower side.

FIG. 9 is a perspective view when a back surface of an operation substrate 110 used in an input device 101 according to a second embodiment is seen from an oblique lower side.

The operation substrate 110 shown in FIG. 9 has the same lamination structure as that of the operation substrate 10 according to the first embodiment, and a second metal plate 120 is fixed to a back surface of a square first metal plate 111 by means of spot welding. The detection portion 31 of the sensor substrate 30 is fixed to a front surface of the first metal plate 111 via a pressure sensitive adhesive, and the upper side of the detection portion 31 is covered with the cover sheet 15.

An opening 121 is formed in the second metal plate 120, the component-mounting substrate 35 is fixed within the opening 121, and a conductive pattern on the component-mounting substrate 35 and a lead pattern provided on the sensor substrate 30 are connected to each other. The circuit components 36a, 36b, and 36c are mounted on the component-mounting substrate 35 within the opening 121 of the second metal plate 120. Since the circuit components 36a, 36b, and 36c are located within the opening 121, the entirety of the operation substrate 110 can be made thin.

In the second metal plate 120, a right-side connection portion 124a is provided so as to extend from the center portion in the Y direction via a step portion 123a in the right direction (X1 direction), and a left-side connection portion 124b is provided so as to extend from the center portion in the Y direction via a step portion 123b in the left direction (X2 direction). The elastic body 41 is retained by the right-side connection portion 124a, and a positioning hole 128a is formed in the right-side connection portion 124a. The elastic body 41 is retained by the left-side connection portion 124b, and a positioning hole 128b is formed in the left-side connection portion 124b.

The elastic body 41 retained by the right-side connection portion 124a is fixed to the support portion 4 of the panel 2 by the retaining member 42, and the elastic body 41 retained by the left-side connection portion 124b is fixed to the support portion 4 of the panel 2 by the retaining member 42. The support structures for the connection portions 124a and 124b are the same as those of the support structure portions 40a and 40b of the input device 1 according to the first embodiment shown in FIGS. 4 and 5 and the like.

In the input device 101 which supports the operation substrate 110 shown in FIG. 9, an imaginary hinge line Sb connecting the width center of the right-side connection portion 124a to the width center of the left-side connection portion 124b is located substantially at the center of the operation substrate 110 in the Y direction and extends in the X direction. Thus, the operation substrate 110 has pressing operation regions on both the Y1 side of the imaginary hinge line Sb and the Y2 side of the imaginary hinge line Sb.

As shown in FIG. 9, an inversion portion 52a constituting a pressing force sensor 150a and an electrode portion which is switched to a contact state when the inversion portion 52a is pressed are provided in a lower surface of the operation substrate 110 on the Y1 side of the imaginary hinge line Sb. In addition, an inversion portion 52b constituting a pressing force sensor 150b and an electrode portion which is switched to a contact state when the inversion portion 52b is pressed are provided in the lower surface of the operation substrate 110 on the Y2 side of the imaginary hinge line Sb.

When the operation surface 15a is pressed in the pressing operation region on the Y1 side of the imaginary hinge line Sb, the operation substrate 110 rotates about the imaginary hinge line Sb in an Ma direction and the pressing force sensor 150a is actuated. In addition, when the operation surface 15a is pressed in the pressing operation region on the Y2 side of the imaginary hinge line Sb, the operation substrate 110 rotates about the imaginary hinge line Sb in an Mb direction and the pressing force sensor 150b is actuated.

In the rotating operation, similarly to the first embodiment, the upper elastic portions 41b of the elastic bodies 41 interposed between the right-side connection portion 124a and the left-side connection portion 124b and the support portions 4 are compressively deformed, and the lower elastic portions 41c of the elastic bodies 41 interposed between the right-side connection portion 124a and the left-side connection portion 124b and the facing members 42a are compressively deformed. Thus, an operation reaction force provided when each pressing operation region is pressed, and the elastic return force of the operation surface 15a are exerted.

Figure 10:
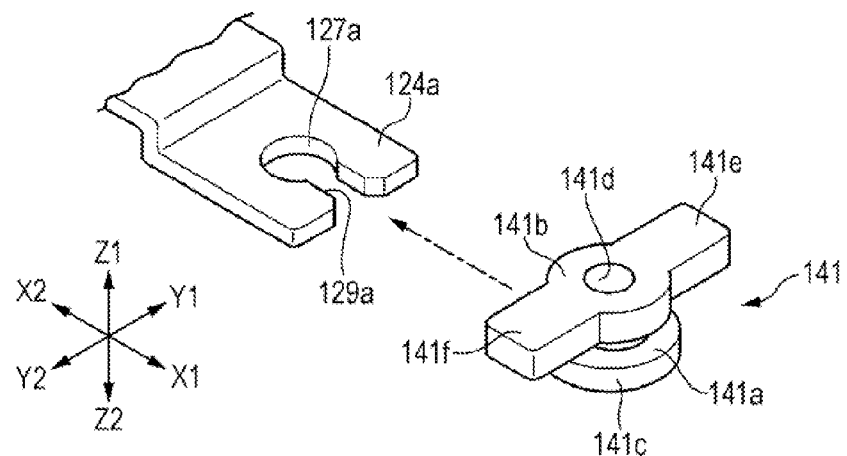
FIG. 10 is an exploded perspective view showing a modified example of the connection portion and an elastic body.

FIG. 10 shows an elastic body 141 of a modified example. The elastic body 141 has a structure suitable for supporting the operation substrate 110 shown in FIG. 9. In the elastic body 141, a lower elastic portion 141c is formed on the lower side of a retaining groove 141a, an upper elastic portion 141b is formed on the upper side of the retaining groove 141a, and a through hole 141d is formed so as to extend through the center portion in the up-down direction. In addition, a return elastic portion 141e extending from the upper elastic portion 141b toward the Y1 side and a return elastic portion 141f extending from the upper elastic portion 141b toward the Y2 side are integrally formed.

As shown in FIG. 10, a retaining hole 127a and an opening 129a connected to the retaining hole 127a and opened in the X1 direction are formed in the right-side connection portion 124a on which the elastic body 141 is mounted. By pressing the elastic body 141 in the X2 direction, a portion where the retaining groove 141a is formed can be retained in the retaining hole 127a. Alternatively, a cut or slit may be formed in the elastic body 141, the right-side connection portion 124a may be inserted into the cut or slit, and the right-side connection portion 124a may be supported by the elastic body 141.

Figure 11:
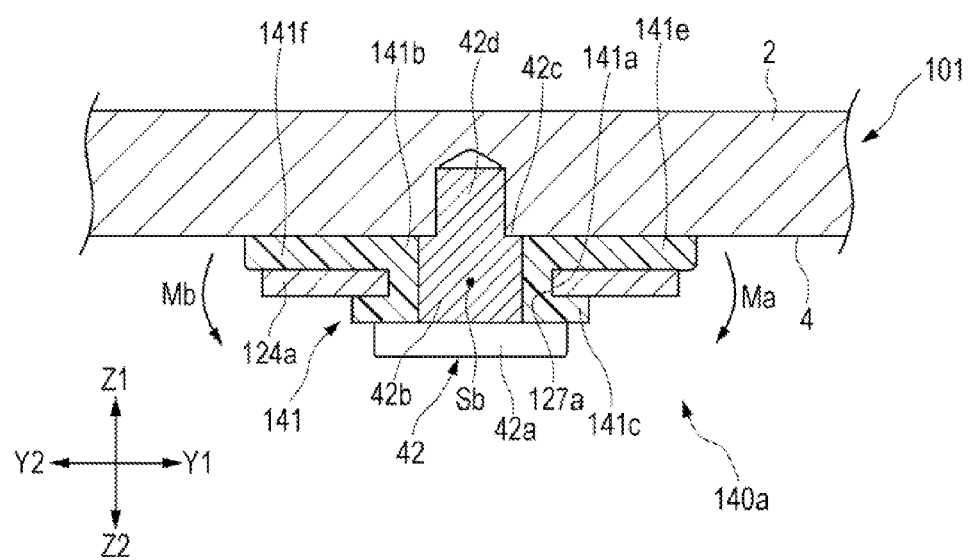
FIG. 11 is a cross-sectional view of a support structure portion in which the connection portion and the elastic body shown in FIG. 10 are combined.

FIG. 11 shows a cross-sectional view of a right-side support structure portion 140a which supports the right-side connection portion 124a to the support portion 4 of the panel 2 by using the elastic body 141.

When the pressing operation region of the operation substrate 110 shown in FIG. 9 on the Y1 side of the imaginary hinge line Sb is pressed and the operation substrate 110 rotates in the Ma direction, the lower elastic portion 141c is compressively deformed between the right-side connection portion 124a and the facing member 42a on the Y1 side of the imaginary hinge line Sb, and the return elastic portion 141f is compressively deformed between the right-side connection portion 124a and the support portion 4 on the Y2 side of the imaginary hinge line Sb.

When the pressing operation region on the Y2 side of the imaginary hinge line Sb is pressed and the operation substrate 110 rotates in the Mb direction, the lower elastic portion 141c is compressively deformed between the right-side connection portion 124a and the facing member 42a on the Y2 side of the imaginary hinge line Sb, and the return elastic portion 141f is compressively deformed between the right-side connection portion 124a and the support portion 4 on the Y1 side of the imaginary hinge line Sb.

The above supporting operation is also the same in a left-side support structure portion 140b which supports the left-side connection portion 124b by using the elastic body 141.

In the support structure, by setting the length dimensions in the Y direction, the width dimensions in the X direction, and further the thickness dimensions in the Z direction of the return elastic portions 141e and 141f of the elastic body 141, the operation reaction force and the restoring force can be set so as to have appropriate strengths for the rotating operation of the operation substrate 110 in the Ma direction and the Mb direction.

It is noted that also in each of the right-side support structure portion 40a and the left-side support structure portion 40b of the input device 1 according to the first embodiment shown in FIG. 5, a return elastic portion can be formed so as to extend from the upper elastic portion 41b of the elastic body 41 in the Y1 direction, namely, in a direction opposite to the direction in which the pressing operation region is present. In this case as well, when the connection portions 24a and 24b rotate in the M1 direction, the return elastic portions are compressed by the connection portions 24a and 24b and the support portions 4. Thus, by setting the size of each return elastic portion, it is possible to set an operation reaction force and an elastic return force provided to the operation substrate 10.

Figure 12:
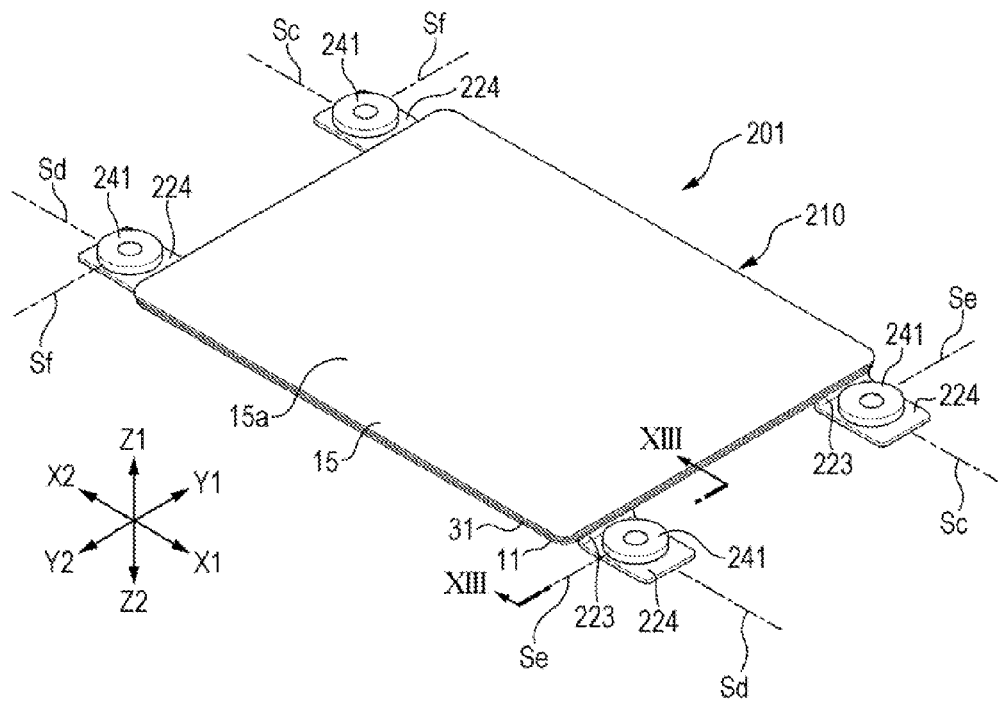
FIG. 12 is a perspective view when an operation substrate used in an input device according to a third embodiment of the present invention is seen from an operation surface side.
Figure 13:
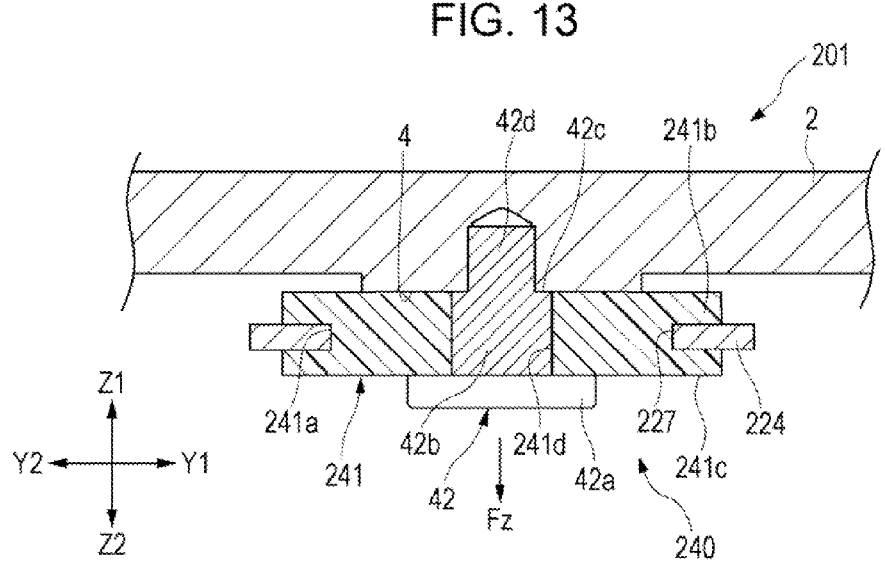
FIG. 13 is a cross-sectional view of a support structure portion of the operation substrate shown in FIG. 12, taken along the XIII-XIII line.

FIG. 12 is a perspective view when an operation substrate 210 used in an input device 201 according to a third embodiment of the present invention is seen from the operation surface 15a side, and FIG. 13 is a cross-sectional view showing support structure portions 240 at four locations which support the operation substrate 210. It is noted that FIG. 13 shows a portion taken along the XIII-XIII line in FIG. 12.

A lamination structure of the operation substrate 210 shown in FIG. 12 is the same as that of the operation substrate 10 according to the first embodiment and that of the operation substrate 110 according to the second embodiment, the detection portion 31 of the sensor substrate 30 is provided on the first metal plate 11, the upper surface of the first metal plate 11 is covered with the cover sheet 15, and the front surface of the cover sheet 15 is the operation surface 15a.

A second metal plate is stacked on a lower surface of the first metal plate 11 and both metal plates are fixed to each other by means of spot welding. As shown in FIG. 12, a connection portion 224 is integrally formed in the second metal plate via a step portion 223 at each of four locations on the Y1 side and the Y2 side of the edge on the X1 side and on the Y1 side and the Y2 side of the edge on the X2 side. An elastic body 241 is retained by each connection portion 224.

As shown in FIG. 13, a retaining hole 227 is formed in the connection portion 224 so as to have a large inner diameter. In the elastic body 241, a large-diameter retaining groove 241a retained in the retaining hole 227, an upper elastic portion 241b on the upper side of the retaining groove 241a, and a lower elastic portion 241c on the lower side of the retaining groove 241a are integrally formed, and a through hole 241d is formed so as to extend through the center portion in the up-down direction.

The elastic body 241 is mounted on the support portion 4 on the lower surface of the panel 2 by the retaining member 42. The structure of the retaining member 42 is the same as that used in the first embodiment shown in FIG. 5.

As shown in FIG. 13, in the support structure portion 240, the support portion 4 and the facing member 42a are formed so as to have smaller diameters than the inner diameter of the retaining hole 227 of the connection portion 224. Thus, the connection portion 224 is allowed to freely move relative to the support portion 4.

When each of the connection portions 224 at the four locations in the operation substrate 210 is supported by the support structure portion 240 shown in FIG. 13, an imaginary hinge line Sc connecting the support structure portions 240 provided on the Y1 side and extending in the X direction and an imaginary hinge line Sd connecting the support structure portions 240 provided on the Y2 side and extending in the X direction are set in the operation substrate 210 as shown in FIG. 12. In addition, an imaginary hinge line Se connecting the support structure portions 240 provided on the X1 side of the operation substrate 210 and extending in the Y direction and an imaginary hinge line Sf connecting the support structure portions 240 provided on the X2 side and extending in the Y direction are set in the operation substrate 210.

When any location is pressed in the operation surface 15a, the operation substrate 210 rotates about one of the imaginary hinge lines Sc, Sd, Se, and Sf. Furthermore, when the center (center of gravity) of the operation surface 15a is pressed, for example, in the Z2 direction to equally apply a force Fz to each support structure portion 240 in the Z direction, the entire operation substrate 210 can be lowered in the Z2 direction.

In order to use the operation substrate 210 shown in FIG. 12, when a pressing force sensor is provided at one location in the back surface at the center thereof, the pressing force sensor can be actuated even if any position is pressed in the operation surface 15a.

Figure 14A:
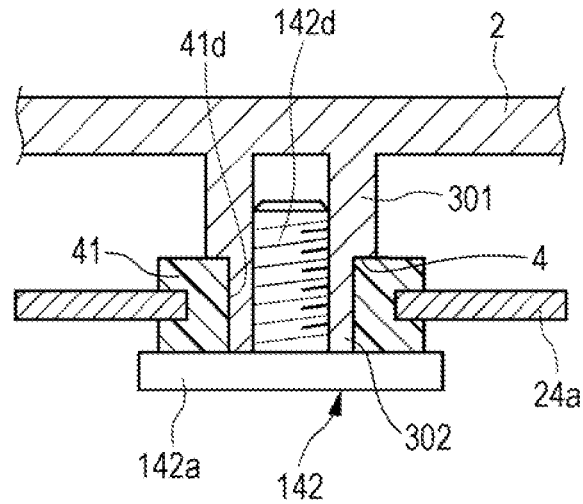
FIGS. 14A and 14B are cross-sectional views showing a modified example of the support structure portion.

In a modified example shown in FIG. 14A, a support column 301 is provided so as to extend from the panel 2 in the downward direction, a support portion 4 is formed in a middle portion thereof by a step, and a small-diameter portion 302 extends from the support portion 4 in the downward direction. The through hole 41d of the elastic body 41 retained by the right-side connection portion 24a is inserted onto the support column 301. A retaining member 142 includes an facing member 142a and an externally-threaded portion 142d which also serves as a shaft portion. By screwing the externally-threaded portion 142d into an internally-threaded hole opened in the small-diameter portion 302, the elastic body 41 can be interposed between the support portion 4 and the facing member 142a.

Figure 14B:
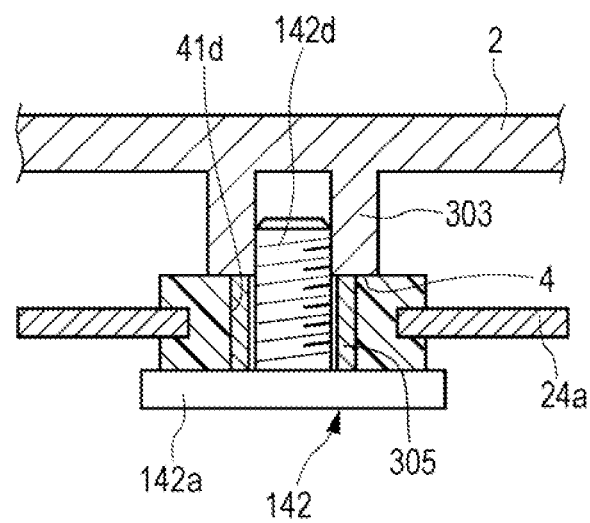

In a modified example shown in FIG. 14B, the support portion 4 is formed on a lower surface of a support column 303 extending from the panel 2 in the downward direction. A tubular spacer 305 is inserted into the through hole 41d of the elastic body 41, and an externally-threaded portion 142d which also serves as a shaft portion of the retaining member 142 is inserted into the spacer 305 to be screwed into an internally-threaded hole formed in the support column 303. Thus, the elastic body 41 is interposed between the support portion 4 and the facing member 142a.

Figure 15A:
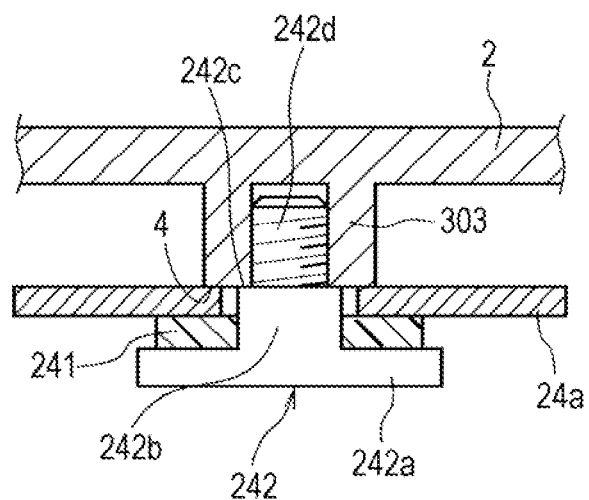
FIGS. 15A and 15B are cross-sectional views showing another modified example of the support structure portion.
Figure 15B:
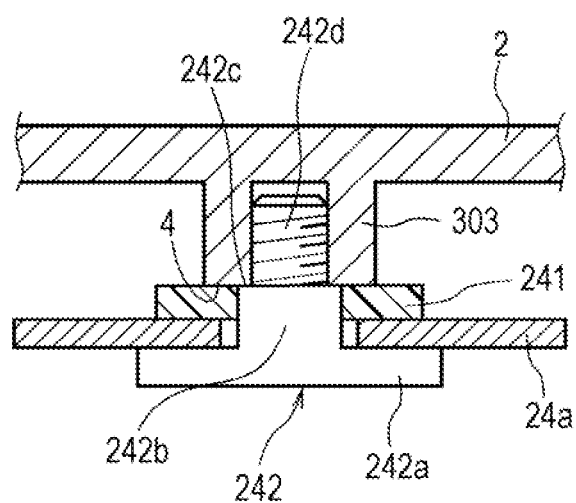

In modified examples in FIGS. 15A and 15B, the support portion 4 is formed on the lower surface of the support column 303 extending from the panel 2 in the downward direction. A retaining member 242 includes an facing member 242a, a shaft portion 242b, and an externally-threaded portion 242d extending from an upper end of the shaft portion 242b via a step portion 242c. The externally-threaded portion 242d is screwed into an internally-threaded portion formed in the support column 303, and the support portion 4 and the facing member 242a face each other at an interval in the up-down direction.

The elastic body 241 has a disc shape. In FIG. 15A, the elastic body 241 is located only between the right-side connection portion 24a and the facing member 242a, and the right-side connection portion 24a is abutted against the support portion 4. In FIG. 15B, the elastic body 241 is located only between the right-side connection portion 24a and the support portion 4, and the right-side connection portion 24a is abutted against the facing member 242a.

In the modified example shown in FIG. 15A, when the right-side connection portion 24a is tilted, the elastic body 241 is compressed between the right-side connection portion 24a and the facing member 242a to exert an operation reaction force and an elastic return force. In the modified example shown in FIG. 15B, when the right-side connection portion 24a is tilted, the elastic body 241 is compressed between the right-side connection portion 24a and the support portion 4 to exert an operation reaction force and an elastic return force.

As described above, if the elastic body is interposed at least either between the connection portion and the support portion or between the connection portion and the facing member, when the connection portion is tilted, the elastic body is compressively deformed to exert an operation reaction force and an elastic return force.

FIGS. 14A and 14B and FIGS. 15A and 15B can be implemented in all the embodiments described in this specification.

Figure 16:
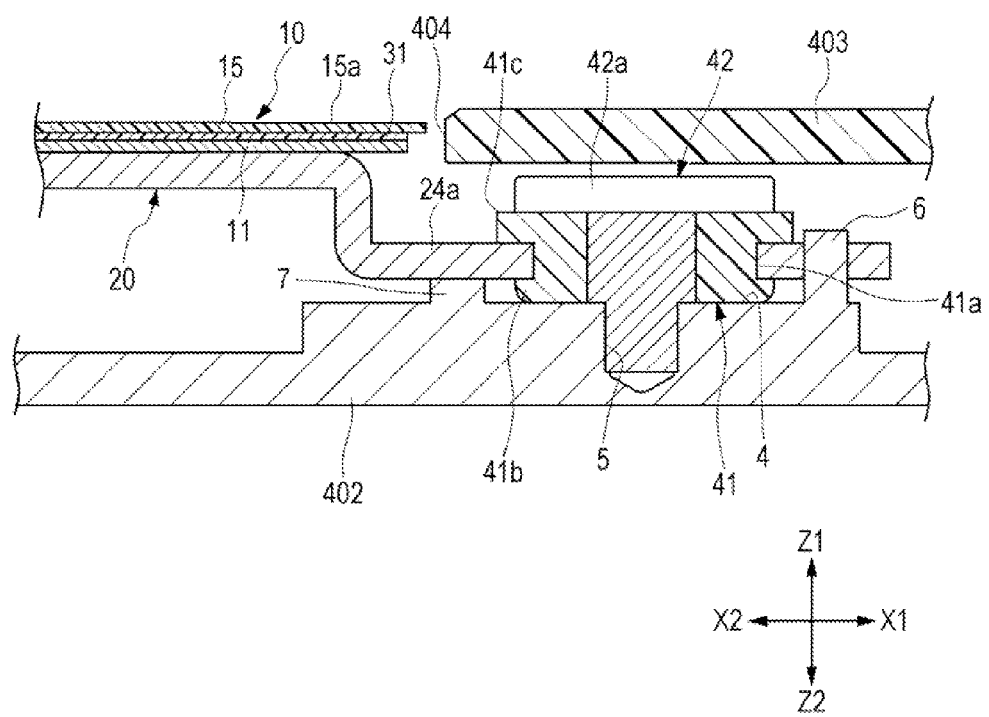
FIG. 16 is an enlarged cross-sectional view of a support structure portion of an input device according to a fourth embodiment of the present invention.

In a right-side support structure portion in a fourth embodiment shown in FIG. 16, an upper surface of a panel 401 is the support portion 4, and the positioning projection 6 and the stopper projection 7 extend in the upward direction (Z1 direction). The retaining groove 41a of the elastic body 41 is retained in a retaining hole of the right-side connection portion 24a, and the elastic body 41 is fixed to the panel 401 by the retaining member 42. In FIG. 16, the elastic body 41 is mounted in the direction opposite to that in the embodiment shown in FIG. 4. It is noted that the elastic body 41 can be mounted in the same direction as that in FIG. 4.

The facing member 42a of the retaining member 42 faces the support portion 4, the upper elastic portion 41b of the elastic body 41 is interposed between the right-side connection portion 24a and the support portion 4, and the lower elastic portion 41c is interposed between the right-side connection portion 24a and the facing member 42a.

It is noted that a left-side support structure portion is also the same as in FIG. 16.

An operation panel 403 is provided above a panel 402, and the operation surface 15a of the operation substrate 10 is located within an opening 404 of the operation panel 403.

What is claimed is:

1. An input device comprising:
   an operation substrate;
   a proximity sensor provided in the operation substrate, the proximity sensor detecting if an operation body is in contact with or in a vicinity of a surface of the operation substrate;
   a pressing force sensor configured to detect a pressing force applied to the operation substrate;
   a panel supporting and holding the operation substrate, the panel including support portions provided to at least two locations on the panel;
   a facing members each facing corresponding one of the support portions at a distance;
   a connection portion extending from the operation substrate, the connection portion being disposed between each facing member and the corresponding support portion; and
   an elastic body including at least one of a first elastic body interposed between each support portion and the connection portion, or a second elastic body interposed between each facing member and the connection portion, the elastic body deforming when a pressing force is applied to the operation substrate, such that the operation substrate moves in a thickness direction thereof to actuate the pressing force sensor,
   wherein the support portions provided at the two locations are spaced apart from each other, and
   the operation substrate is configured to rotate around an imaginary hinge line connecting the support portions at the two locations.

2. The input device according to claim 1, wherein the elastic body has a through hole formed therein wherein the facing member has a shaft portion inserted into the through hole and fixed to each support portion, and wherein the elastic body is compressively deformable toward an axial direction of the shaft portion.

3. The input device according to claim 1, wherein the imaginary hinge line is located at or in a vicinity of an edge of the operation substrate, and a main pressing operation region is formed on of the operation substrate on one side of the imaginary hinge line.

4. The input device according to claim 3, wherein the elastic body includes a return elastic portion extending in a direction perpendicular to the imaginary hinge line.

5. The input device according to claim 1, wherein the imaginary hinge line passes through a middle portion of the operation substrate, and a respective main pressing operation region is formed on the operation substrate on both sides of the imaginary hinge line.

6. The input device according to claim 1, wherein the operation substrate includes: a metal plate set at a ground potential; a sensor substrate provided on a front surface of the metal plate and made from a synthetic resin film; an insulating cover layer covering the sensor substrate; and an electrode layer provided on the sensor substrate, the electrode layer forming the proximity sensor.

7. The input device according to claim 6, wherein the operation substrate further includes:
a second metal plate attached to a back surface of the metal plate,
and wherein a portion of the second metal plate being bent to form the connection portion.

8. The input device according to claim 6, wherein the sensor substrate includes a backside portion extending therefrom and bending to a back surface of the metal plate, the input device further comprising:
a circuit component mounted on the backside portion of the sensor substrate or on a component-mounting substrate connected to the sensor substrate, and
wherein an earth-conduction portion of a portion where the circuit component is mounted is electrically connected to the metal plate.

9. The input device according to claim 6, wherein the sensor substrate includes a backside portion extending therefrom and bending to a back surface of the metal plate, and
wherein the pressing force sensor is mounted on the backside portion of the sensor substrate.

* * * * *